(12) United States Patent
Andre et al.

(10) Patent No.: US 10,001,812 B2
(45) Date of Patent: Jun. 19, 2018

(54) CHIN PLATE FOR A PORTABLE COMPUTING DEVICE

(71) Applicant: Apple Inc., Cupertino, CA (US)

(72) Inventors: Bartley K. Andre, Menlo Park, CA (US); Kevin M. Robinson, Sunnyvale, CA (US); Mikael M. Silvanto, San Francisco, CA (US); Robert Y. Cao, San Francisco, CA (US); Bryan W. Posner, La Selva Beach, CA (US); Wey-Jiun Lin, Los Altos Hills, CA (US); Dinesh C. Mathew, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 14/825,137

(22) Filed: Aug. 12, 2015

(65) Prior Publication Data
US 2016/0259375 A1 Sep. 8, 2016

Related U.S. Application Data

(60) Provisional application No. 62/128,955, filed on Mar. 5, 2015.

(51) Int. Cl.
*G06F 1/16* (2006.01)
(52) U.S. Cl.
CPC .......... *G06F 1/1656* (2013.01); *G06F 1/1616* (2013.01)
(58) Field of Classification Search
CPC .......... G06F 1/203; G06F 2203/04107; G06F 1/1616; G06F 1/1656; G06F 1/1626; G06F 1/1643; G06F 1/1681; G06F 1/1684; G06F 1/181; G06F 1/1613; G06F 1/1633; G06F 1/1637; G06F 1/1679; G06F 1/16
USPC .............. 361/816, 818, 800, 679.09, 679.01, 361/679.02, 679.26, 679.27
See application file for complete search history.

(56) References Cited

U.S. PATENT DOCUMENTS

| | | | |
|---|---|---|---|
| 5,379,183 A | 1/1995 | Okonsky et al. | |
| 7,089,628 B2 | 8/2006 | Lin et al. | |
| 7,239,504 B2 | 7/2007 | Schlesener et al. | |
| 8,174,452 B2 * | 5/2012 | Ayala Vazquez | H01Q 1/2266 343/700 MS |
| 2002/0024052 A1 * | 2/2002 | Liang | H01L 33/0045 257/79 |

(Continued)

*Primary Examiner* — Dimary Lopez Cruz
*Assistant Examiner* — Ingrid Wright
(74) *Attorney, Agent, or Firm* — Brownstein Hyatt Farber Schreck, LLP

(57) ABSTRACT

A cover plate for a portable electronic device is disclosed. The cover plate can be used as a cosmetic feature disposed on a display or cover glass of the portable computing device. For instance, the cover plate may include one or may layers disposed on a surface of the cover plate. In some cases, the layers are formed on a rear surface of the cover plate. In addition to enhancing the appearance of the portable electronic device, the cover plate provides additional a protective layer to internal components positioned behind the cover plate. Moreover, the cover plate may formed from an electromagnetically transparent material such as glass to allow receipt and/or transmission of electromagnetic waves in the form of radio frequencies. Also, the cover plate offers protection to the display and cover glass when the portable electronic device is in a closed configuration.

20 Claims, 12 Drawing Sheets

(56) References Cited

U.S. PATENT DOCUMENTS

2005/0062657 A1* 3/2005 Lin ................. G06F 1/1616
                                          343/702
2007/0206137 A1* 9/2007 Akiyama ........... G02B 6/0038
                                          349/113
2011/0273375 A1* 11/2011 Wilford ........... H03K 17/962
                                          345/173

* cited by examiner

CHIN PLATE FOR A PORTABLE COMPUTING DEVICE

CROSS-REFERENCE TO RELATED APPLICATION(S)

This application claims the benefit of priority under 35 U.S.C § 119(e) to U.S. Provisional Application No. 62/128,955, filed on Mar. 5, 2015, the disclosure of which is incorporated herein by reference in its entirety.

FIELD

The described embodiments relate generally to portable electronic devices. In particular, the present embodiments relate to a cover feature for a display of a portable electronic device.

BACKGROUND

Some portable electronic devices continue toward a trend of reducing their overall footprint. However, in some cases, certain features of a portable electronic device may remain the same size or even increase in size while still achieving the overall reduced footprint of the portable electronic device. For instance, a laptop computing device having a display housing used to receive a display may be reduced in size while the display includes the same size or increases in dimension. In order to do so, a frame or border region surrounding the display must be decreased.

However, reducing the frame or border may reduce the structural support or rigidity provided to the display. Also, a smaller display housing may require internal components previously in the display housing to be positioned in other areas, such as a bottom portion of the portable electronic device. This requires a redesign of the device, as new data communication (for example, wiring) must be introduced between the display and the internal components. In order to incorporate new data communication, some internal components remaining in the display housing may be exposed to the environment making them susceptible to damage. Alternatively, the internal components may be removed from the display housing which may cause a reduction in functionality of the portable electronic device.

SUMMARY

In one aspect, a cover plate for covering a component of a display of an electronic device is described. The cover may plate may include a substrate formed from a transparent material. The cover plate may further include a first layer disposed on the substrate. The cover plate may further include a second layer disposed on the substrate. In some embodiments, the second layer defines an indicium. The cover plate may further include a third layer disposed on the first layer and the second layer.

In another aspect, a portable electronic device is described. The portable electronic device may include a bottom portion that includes a keyboard and a recessed portion for receiving a hinge. The portable electronic device may further include a top portion rotationally coupled with the bottom portion. In some embodiments, the top portion includes a display and a cover glass disposed over the display. The portable electronic device may further include a cover plate secured with the cover glass. The cover plate may include a first surface and a second surface opposite the first surface. The second surface may include a first layer formed from an opaque material. The second surface may further include a second layer. In some embodiments, the first layer and the second layer are visible through the cover plate.

In another aspect, a method for forming a cover plate from a substrate is described. The cover plate may be suitable for use with a portable computing device. The method may include receiving, at a first surface of the cover plate, a material removal process to a form a pattern across the first surface to change an appearance of the first surface. The method may further include applying a first layer to a second surface the substrate opposite the first surface, the first layer include a void region. The method may further include applying a second layer to the second surface at the void region.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
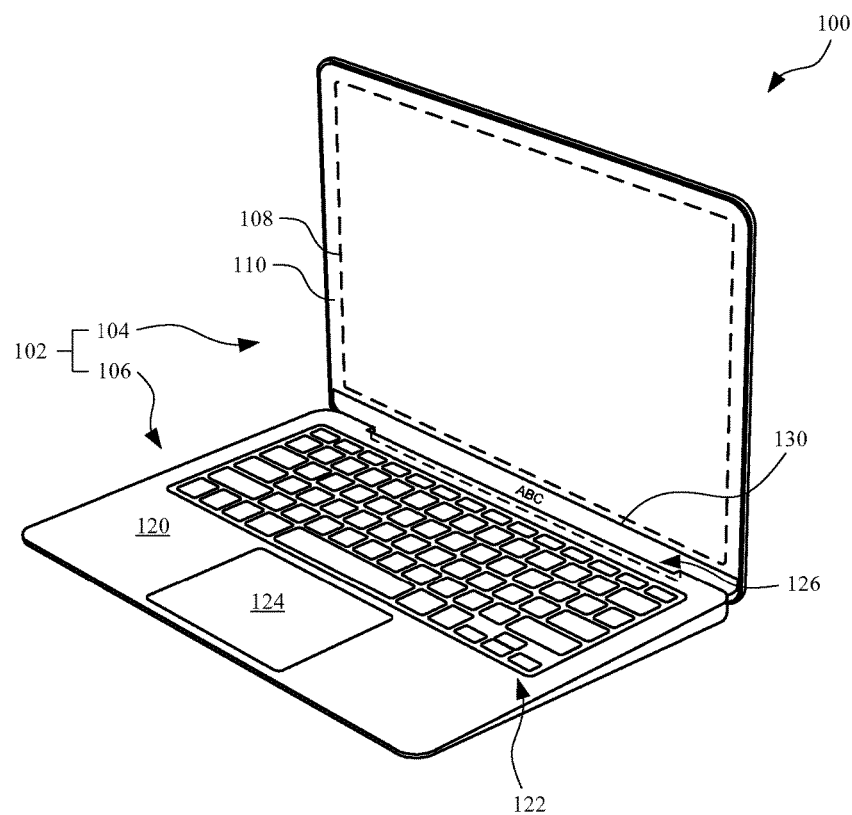
FIG. 1 illustrates an isometric view of an embodiment of a portable electronic device in an open configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to features of a portable electronic device (e.g., laptop computing device). In particular, the disclosure includes a cover plate for the portable electronic device and related features of the cover plate. The cover plate may be used for multiple purposes. For instance, the cover plate may be disposed on a display, or a cover glass of the display. The cover plate may include an appearance substantially similar to that of the display to provide a continuous appearance of the display.

The display housing may include reduced dimensions as compared to traditional display housings. However, the display may include the same dimensions or even larger dimension than traditional displays associated with the reduced dimensions of the display housing. This requires some internal components to be moved from the display housing to a bottom portion defined by a top case and a bottom case. These internal components may nonetheless be electrically coupled with the display or a light-emitting diode ("LED") panel associated with the display via one or more flexible circuits. The cover plate is designed to hide an appearance of these flexible circuits extending from the display housing to the bottom portion. The cover plate can further hide the appearance of several other internal components remaining in the display housing, such as the LED panel or an integrated circuit, thereby providing not only a protective cover for the internal components, but also provide an aesthetically pleasing appearance by covering the internal components.

Also, the cover plate may be made from an electromagnetically transparent material, such as glass, to allow certain radio frequencies to pass through the cover plate. In this manner, an operational component, such as an antenna, can transmit and/or receive radio frequencies associated with, for example, Bluetooth or Wi-Fi.

The cover plate may include a substrate having a first surface. The first surface may be referred to as a front surface visible when the cover plate is secured with the display or cover glass. The first surface may include a texture or roughness substantially similar to another component of the portable electronic device, such as a track pad used to input gestures to the portable electronic device. Also, the cover plate may include on more layers designed to enhance the appearance of the cover plate. For example, the cover plate may include a first layer disposed on a second surface of the substrate opposite the first surface. Accordingly, the second surface may be referred to as a rear surface opposite the front surface. The first layer may be formed from an ink material having a color similar to that of the display or border region around the display. In some cases, the cover plate may further include an additional second layer on the second surface. The second layer may be formed from an ink material defining a letter, word, symbol, shape, or combination thereof. In some cases, the cover plate further includes an additional third layer disposed over the first layer and the second layer. The third layer may also be formed from an ink layer. Each of the layers may be applied by printing techniques, such as screen printing, or other printing techniques generally known in the art for applying ink to a glass substrate.

The cover plate, and in particular the substrate, may undergo additional processes such as a chemical strengthening process designed to improve the rigidity of the cover plate. In this manner, the cover plate is able to withstand additional load forces associates use of a portable electronic device, such as dropping the portable electronic device. The improved rigidity provides additional support and protection to the internal components positioned behind the cover plate and not visible to a user.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates an isometric view of an embodiment of a portable electronic device 100 in an open configuration. In some embodiments, the portable electronic device 100 is a laptop computing device. The portable electronic device 100 may include an enclosure 102 that encloses several internal components of the portable electronic device 100. In some embodiments, the enclosure 102 formed from a metal, such as aluminum. As shown, the enclosure 102 includes a top portion 104 rotationally coupled with a bottom portion 106 via a clutch and hinge (not shown). The top portion 104 includes a display 108 designed to display visual content, and a cover glass 110 disposed over the display 108. Accordingly, the top portion 104 may be referred to as a display housing.

The bottom portion 106 includes a top case 120 coupled with a bottom case (not shown). The top case 120 and the bottom case may combine to enclose several internal components (for example, a battery, a memory circuit, and a processor circuit). The bottom portion 106 also includes a keyboard assembly 122 having several key caps protruding partially through openings of the top case 120, as shown. The bottom portion 106 may further include a track pad 124 designed to facilitate one or more input gestures to the portable electronic device 100. Also, the bottom portion 106 can include a recessed portion 126 that may receive the hinge (not shown) when the portable electronic device 100 is in a closed configuration (shown in FIG. 2).

Referring again to the top portion 104, a cover plate 130 can be disposed on the top portion 104. The cover plate 130 may be adhesively secured with the cover glass 110 via an adhesive layer (not shown). In some embodiments, the adhesive layer is a pressure sensitive adhesive. The cover plate 130 can be used to cover several internal components (not shown) in the top portion 104. For example, the cover plate 130 may cover one or more flexible circuits (not shown) extending from the top portion 104 to the bottom portion 106. One of the flexible circuits allows data communication between the display 108 and a processor circuit located in the bottom portion 106. Another flexible circuit may allow for electrical power from a battery pack, located in the bottom portion 106, to the display 108.

Also, when the top portion 104 includes reduced dimensions, at least some internal components traditionally located in the top portion 104 can be located in the bottom portion 106 as the volume in the top portion 104 decreases. This may also be necessary when the display 108 does not include reduced dimensions. The hidden flexible circuits allow for communications between the internal components now located in the bottom portion 106 with other components located in the top portion 104. In this manner, the portable electronic device 100 can include a smaller footprint without the loss of internal components, and accordingly, without the loss of functionality of the portable electronic device 100.

Figure 2:
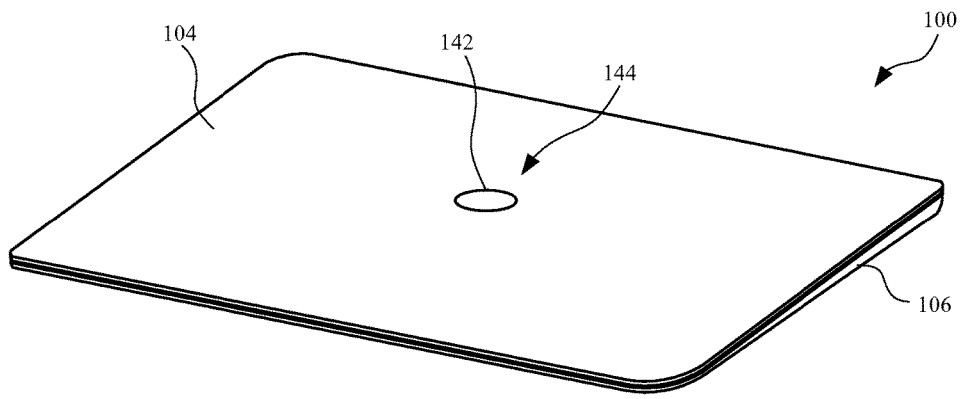
FIG. 2 illustrates an isometric view of the portable electronic device shown in FIG. 1, with the portable electronic device in a closed configuration.

FIG. 2 illustrates an isometric view of the portable electronic device 100 shown in FIG. 1, with the portable electronic device 100 in a closed configuration. The closed configuration may be defined as the top portion 104 rotated in a direction toward the bottom portion 106 such that the top portion 104 is proximate to the bottom portion 106, as shown in FIG. 2. Also, in some embodiments, the top portion 104 includes a logo 142 located in a central portion 144 of the top portion 104.

Figure 3:
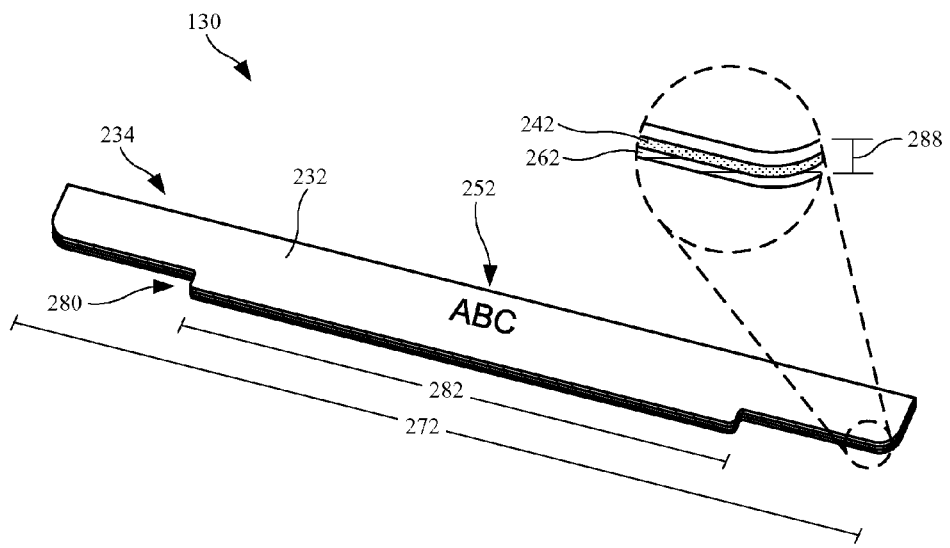
FIG. 3 illustrates an isometric front view of the cover plate, in accordance with the described embodiments.

FIG. 3 illustrates an isometric front view the cover plate 130, in accordance with the described embodiments. The cover plate 130 may include several features. For example, the cover plate may include a substrate 232. In some embodiments, the substrate 232 is formed from plastic. In other embodiments, the substrate 232 is formed from carbon fiber. Further, in other embodiments, the substrate 232 is formed from fiberglass. In the embodiment shown in FIG. 3, the substrate 232 is formed from glass. Accordingly, the substrate 232 may be formed from a transparent material. Generally, the substrate 232 can be formed by any material or materials that include a relatively high stiffness-to-thickness ratio, while also allowing electromagnetic waves to pass through the substrate 232. In this manner, an internal component such as an antenna (not shown) can be positioned in the top portion 104 (shown in FIG. 1) and also behind the substrate 232, and the internal component still send and receive electromagnetic waves passing through substrate 232. In other embodiments, the substrate 232 is formed from stainless steel sufficiently thin to allow electromagnetic waves to pass.

The substrate 232 can undergoes several processes to alter the texture or roughness. For example, the substrate 232 may undergo a blasting process (for example, sand blast) and/or chemical etching process to obtain a surface roughness similar to that of the track pad 124 (shown in FIG. 1). In particular, the blasting process may be followed by the chemical etching process. In addition, in some embodiments, the substrate 232 includes an anti-reflective coating. In this manner, the cover plate 130 may include an appearance substantially similar to that of the display 108 (shown in FIG. 1). Also, in order to straighten and/or increase the stiffness of the substrate 232, the substrate 232 may further undergo a chemical process designed to chemically strengthen the substrate 232. This may include submerging the substrate 232 in a chemical bath that includes potassium nitrate at a relatively high temperature (for example, 300 degrees Celsius or greater).

As shown, the substrate 232 includes a first surface 234. The first surface 234 may be associated with a surface that extends away from the cover glass 110 (shown in FIG. 1). In other words, the first surface 234 is a surface that is visible when installed on the cover glass 110. It will be appreciated that the first surface 234 may undergo or include the previous processes, such as the blasting process, chemical etching, and the anti-reflective coating. Along with the substrate 232, the cover plate 130 may include several features. For example, the cover plate 130 may include a first layer 242. In some embodiments, the first layer 242 is an ink layer. Generally, the first layer 242 is an opaque layer applied to the substrate 232. Accordingly, the first layer 242 may be formed from a relatively dark material, such as black ink. However, alternatively, an opaque material including a lighter color may be applied. Also, in some embodiments, the first layer 242 is applied by screen printing onto a second surface of the substrate 232. The second surface may be referred to as a surface that is opposite the first surface 234. This will be discussed below. Accordingly, as shown in the enlarged view, the first layer 242 may be located behind the substrate 232 and therefore positioned between the substrate 232 and the cover glass 110 (shown in FIG. 1) when the cover plate 130 is installed. However, when the substrate 232 is formed from a transparent material such as glass, the first layer 242 is still visible when the cover plate 130 is installed.

The cover plate 130 can also include a second layer 252. In some embodiments, the second layer 252 defines an indicium. As shown in FIG. 3, the second layer 252 includes several letters. However, in other embodiments, the second layer 252 defines a word, a number, a shape, a symbol, or a combination thereof. Like the first layer 242, the second layer 252 may also be applied to the second surface of the substrate 232. Further, the first layer 242 may be applied to the substrate 232 such that certain voids in the first layer 242 define an outer perimeter of the second layer 252. In other words, the first layer 242 may not be fully applied to the second surface, and in those regions, the second layer 252 is applied to the second surface of the substrate 232. The second layer 252 may include any material or materials used to form the first layer 242, and may be applied to the second surface in any manner used to apply the first layer 242. However, the second layer 252 may include an appearance different from that of the first layer 242. As a non-limiting example, the first layer 242 may be black while the second layer 252 is selected from a color consisting of gray, red, blue, green, yellow, or a combination thereof. Also, in some embodiments, the second layer 252 includes an appearance similar to that of the track pad 124 (shown in FIG. 1). For instance, the second layer 252 may include a color substantially similar to that of the track pad 124.

The cover plate 130 may further include a third layer 262 disposed on the first layer 242 and the second layer 252. The third layer 262 may be formed from any material used to form the first layer 242 and the second layer 252, and may be applied to the second surface in any manner used to apply the first layer 242 and the second layer 252. In some embodiments, the third layer 262 includes a relatively dark appearance similar to that of the first layer 242. The first layer 242, the second layer 252, and the third layer 262 may combine to define a cosmetic layer that enhances the appearance of the substrate 232 while also cooperating with the substrate 232 to form a radio-transparent cover allow passage of certain electromagnetic radiation.

Also, the cover plate 130 may include a first dimension 272 representative of a lengthwise dimension of the cover plate. The first dimension 272 may be approximately similar to a lengthwise dimension of the cover glass 110 (shown in FIG. 1). However, in other embodiments, the first dimension 272 can be increased or decreased to a desired dimension. Also, the cover plate 130 can include an extended region 280 having a second dimension 282 less than the first dimension 272. Generally, the second dimension 282 is approximately greater than a dimension of the recessed portion 126 of the top case 120 (shown in FIG. 1). In this manner, the extended region 280 of the cover plate 130 may hide or cover additional internal components when the portable electronic device 100 is in an open configuration (shown in FIG. 1). Further, the first layer 242 and the third layer 262 may also be applied to the extended region 280.

The cover plate 130 may include a thickness 288 that accounts for the combined thickness of the substrate 232, the first layer 242, the second layer 252, and the third layer 262. In some embodiments, the thickness 288 is less than 1 millimeter ("mm"). In the embodiment shown in FIG. 3, the thickness 288 is less than 0.4 mm. It will be appreciated that some features or dimensions are not drawn to scale and may be exaggerated to show certain details.

Figure 4:
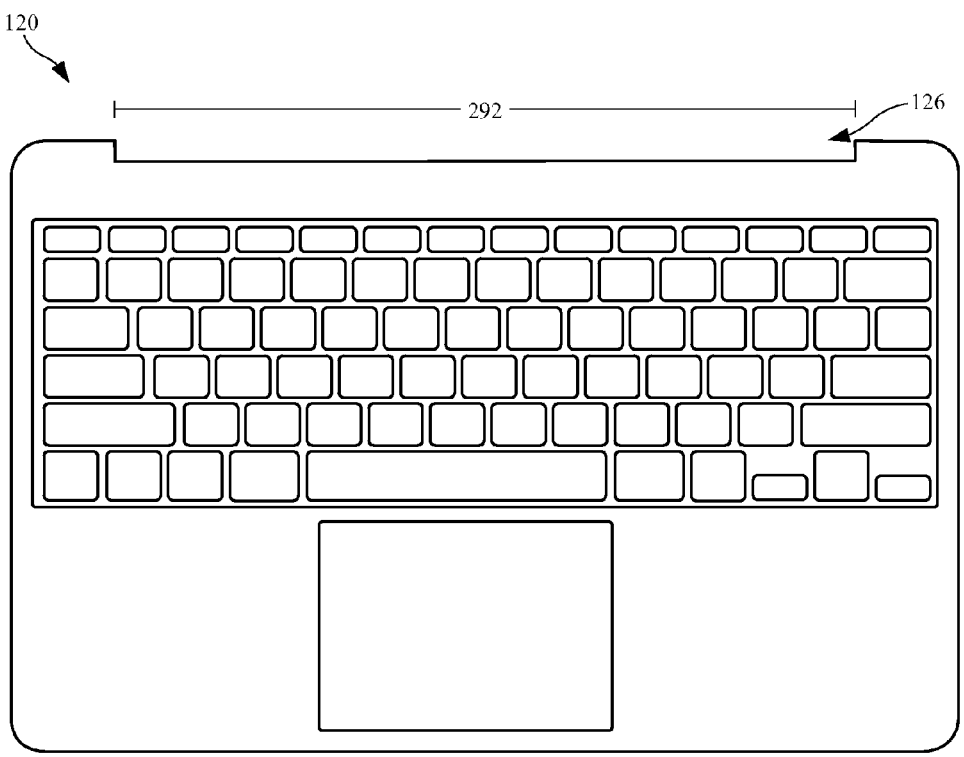
FIG. 4 illustrates a plan view of the top case shown in FIG. 1.

FIG. 4 illustrates a plan view of the top case 120 shown in FIG. 1. The top case 120 includes a recessed portion 126 designed to receive at least a portion of a clutch and a hinge when the top portion 104 is rotated toward the bottom portion 106 (for example, as shown in FIG. 2). The recessed portion 126 may include a dimension 292 that may be less than or equal the second dimension 282 of the extended region 280 (shown in FIG. 3).

Figure 5:
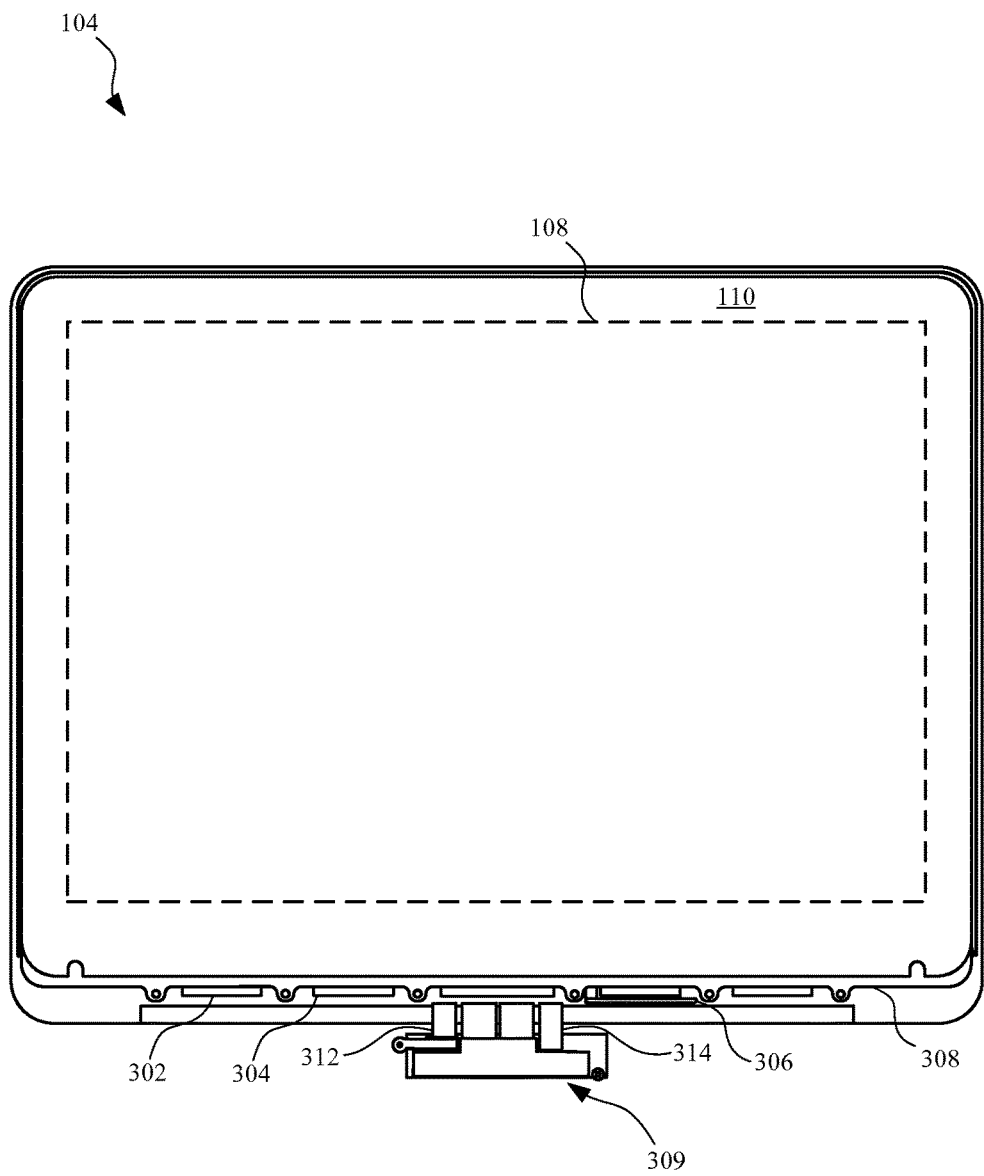
FIG. 5 illustrates a front view of the top portion shown in FIG. 1, with the cover plate removed.

FIG. 5 illustrates a front view of the top portion 104 shown in FIG. 1, with the cover plate removed. As shown, several internal components are visible in the top portion 104 when the cover plate is removed. For instance, a first internal component 302, a second internal component 304, and a third internal component 306 can be located proximate to an attachment plate 308. In some embodiments, the first internal component 302 is an integrated circuit associated with the display 108. Also, in some embodiments, the second internal component 304 is a retaining mechanism for a light source used with the display 108. Also, in some embodiments, the third internal component 306 is an antenna designed to send or receive electromagnetic waves in the form of radio frequencies. The attachment plate 308 can be used to further secure the display 108 and the cover glass 110 with the top portion 104. Also, an adhesive layer (not shown) may secure the display 108 with the attachment plate 308. As shown, the attachment plate 308 is secured with the top portion 104 via several fasteners.

Also, several flexible circuits may extend from the top portion 104. For instance, FIG. 5 shows a flexible circuit assembly 312 that allows allow internal components, such as the fourth internal component 309, to be positioned in the bottom portion 106 (shown in FIG. 1) rather than the top portion 104, as may be custom in traditional portable electronic devices. This allows for the top portion 104 to include decreased dimensions without sacrificing the total number of internal components of a portable electronic device.

Figure 6:
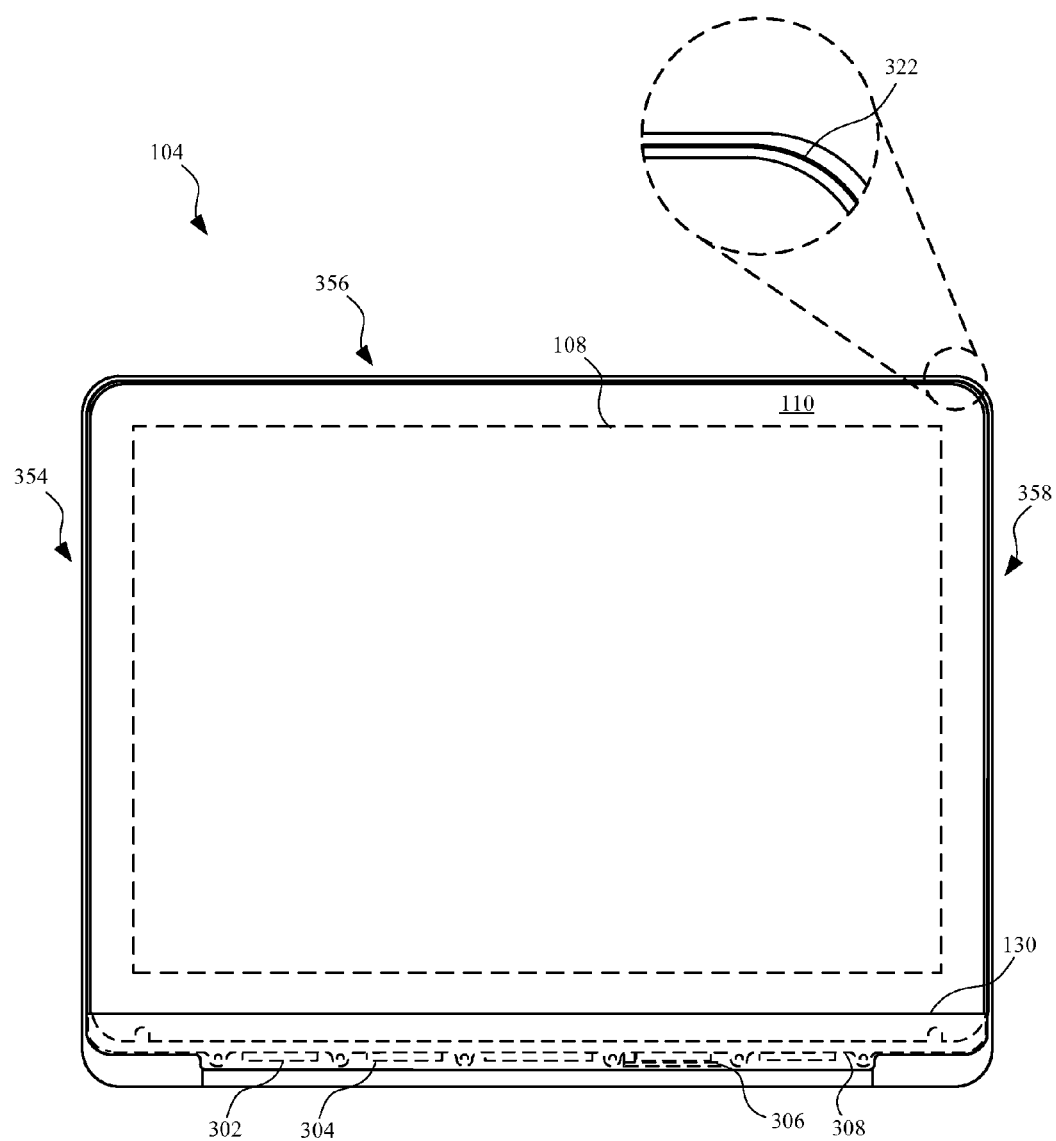
FIG. 6 illustrates a front view of the top portion shown in FIG. 5, with the cover plate secured with the cover glass.

FIG. 6 illustrates a front view of the top portion 104 shown in FIG. 5, with the cover plate 130 secured with the cover glass 110. The cover plate 130 may be secured to the cover glass 110 via an adhesive layer (not shown). The flexible circuit assembly 312 and the fourth internal component 309 (shown in FIG. 5) are removed for purposes of clarity and simplicity. The cover plate 130 is designed contents in the top portion 104 located behind the cover plate 130, such as the first internal component 302, the second internal component 304, the third internal component 306, and the attachment plate 308. Further, when the third internal component 306 is an antenna, the third internal component 306 is capable of transmitting and/or receiving electromagnetic waves. Accordingly, the cover plate 130 not only provides a cosmetic cover that protects the internal components, but also is transparent with respect to electromagnetic waves in the form of radio frequencies. In addition, the materials forming the first layer 242, the second layer 252, and the third layer 262 (shown in FIG. 3) also allow transmission of electromagnetic waves.

FIG. 6 shows further functional features in the top portion 104. For example, the top portion 104 may further include a display support feature 322 that extends along a first side 354, a second side 356, and a third side 358 of the top portion 104. The display support feature 322 may be formed from a compressible material, such as rubber. Also, in some embodiments, the display support feature 322 terminates on the first side 354 and the third side 358 in a location proximate to the cover plate 130. In this manner, when the portable electronic device 100 is in a closed configuration (shown in FIG. 2), the cover plate 130 and the display support feature 322 combine to engage the bottom portion 106 to prevent the cover glass 110 from contacting the bottom portion 106 or other features of the bottom portion 106, such as the keyboard assembly 122 (shown in FIG. 1). The cover plate 130 and the display support feature 322 therefore combine to define a display protection that prevents certain load-bearing events to a portable electronic device that would otherwise cause deflection or displacement of the display 108. This may be particularly useful when, for example, the load-bearing event is applied to the central portion 144 of the portable electronic device 100 in the closed configuration (shown in FIG. 2).

Figure 7:
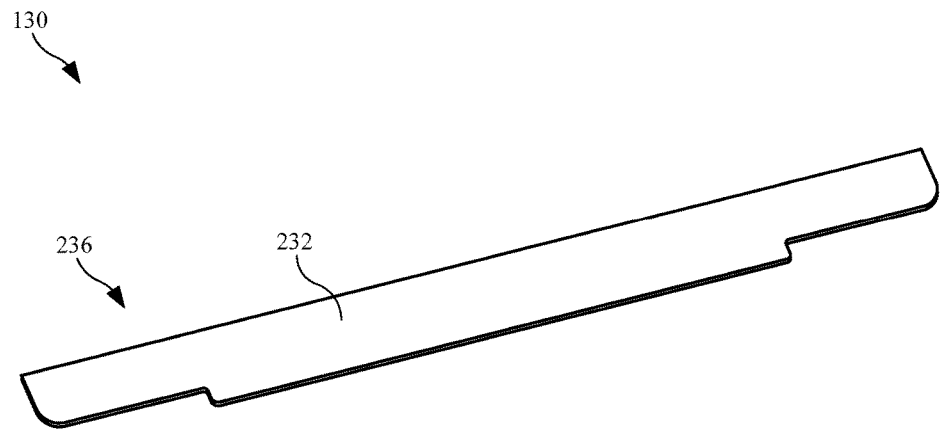
FIG. 7 illustrates an isometric rear view of an embodiment of the substrate used to form the cover plate.
Figure 8:
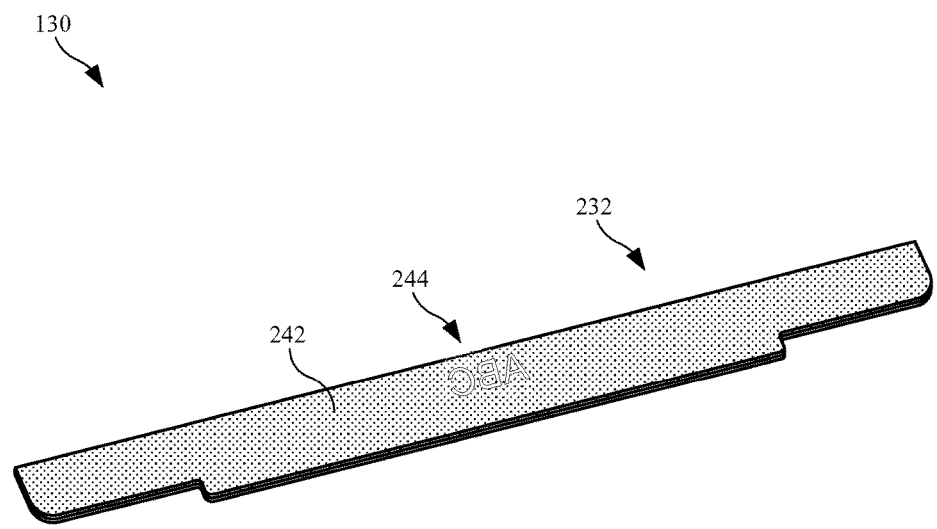
FIG. 8 illustrates an isometric rear view of the cover plate shown in FIG. 7, with the first layer disposed on the second surface of the substrate.

FIGS. 7-10 illustrate a process for forming the cover plate 130. FIG. 7 illustrates an isometric rear view of an embodiment of the substrate 232 used to form the cover plate 130. The substrate 232 includes a second surface 236 opposite the first surface 234 (shown in FIG. 3). FIG. 8 illustrates an isometric rear view of the cover plate 130 shown in FIG. 7, with the first layer 242 disposed on the second surface 236 (shown in FIG. 7) of the substrate 232. In some embodiments, the first layer 242 completely covers the second surface 236. In the embodiment shown in FIG. 8, the first layer 242 includes void regions 244 that do not include material used to form the first layer 242. Accordingly, the void regions 244 may define a shape of an additional layer or layers.

Figure 9:
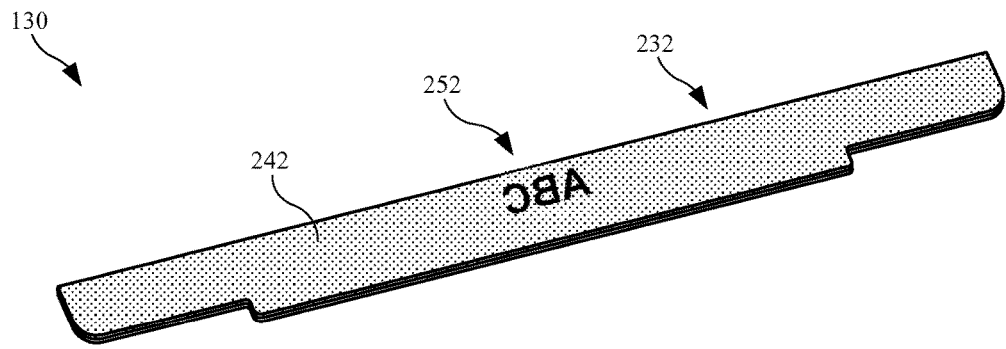
FIG. 9 illustrates an isometric rear view of the cover shown in FIG. 8, with a second layer disposed on the second surface.

FIG. 9 illustrates an isometric rear view of the cover plate 130 shown in FIG. 8, with a second layer 252 disposed on the second surface 236 (shown in FIG. 7) of the substrate 232. As shown, the dimensions of the second layer 252 are slightly larger than the dimensions of the void regions 244 (shown in FIG. 8) of the first layer 242. This ensures the second layer 252 completely covers the void regions 244. Accordingly, the second layer 252 includes material disposed on both the second surface 236 of substrate 232 and the first layer 242.

Figure 10:
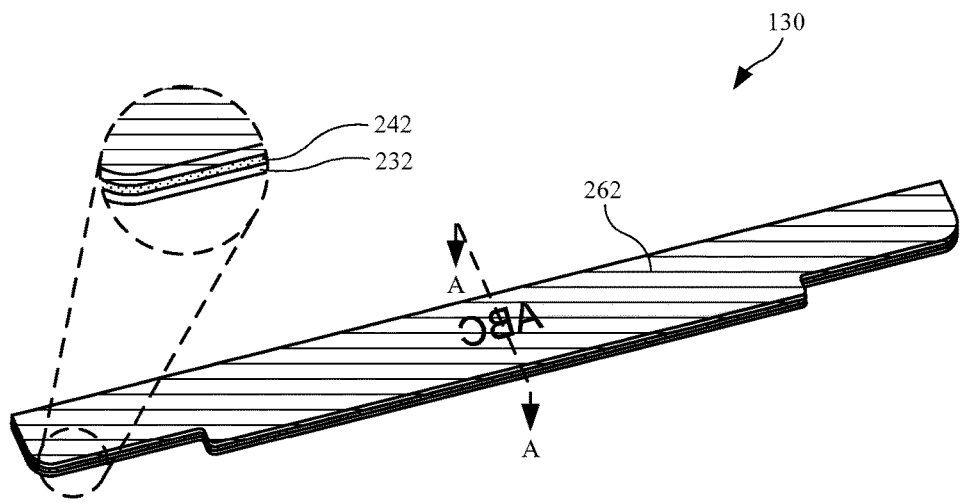
FIG. 10 illustrates an isometric rear view of the embodiment shown in FIG. 9, with a third layer disposed on the first layer and the second layer.

FIG. 10 illustrates an isometric rear view of the cover plate 130 shown in FIG. 9, with the third layer 262 disposed on the first layer 242 and the second layer 252. The enlarged view shows substrate 232, the first layer 242, and the third layer 262. In this configuration, when the cover plate 130 is secured with the cover glass 110 (as shown in FIG. 1), an adhesive layer, such as PSA, engages both the third layer 262 as well as the cover glass 110.

Figure 11:
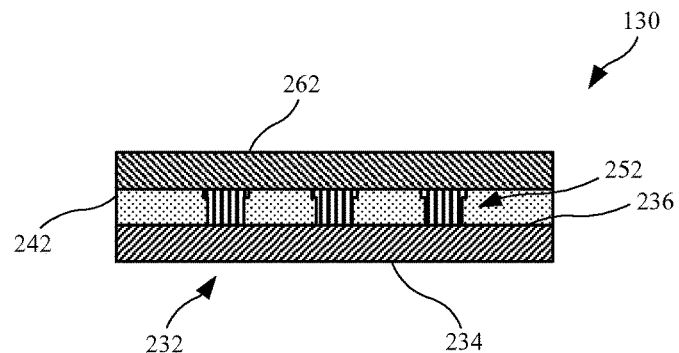
FIG. 11 illustrates a cross sectional view of the cover plate shown in FIG. 10, taken along the A-A line.

FIG. 11 illustrates a cross sectional view of the cover plate 130 shown in FIG. 10, taken along the A-A line. As shown, both the first layer 242 and the second layer 252 engage the second surface 236 of the substrate 232, and the third layer 262 is disposed on both the first layer 242 and the second layer 252. When the substrate 232 is formed from a transparent material such as glass, the first layer 242 and the second layer 252 are visible when viewing the first surface 234 of the substrate 232.

Figure 12:
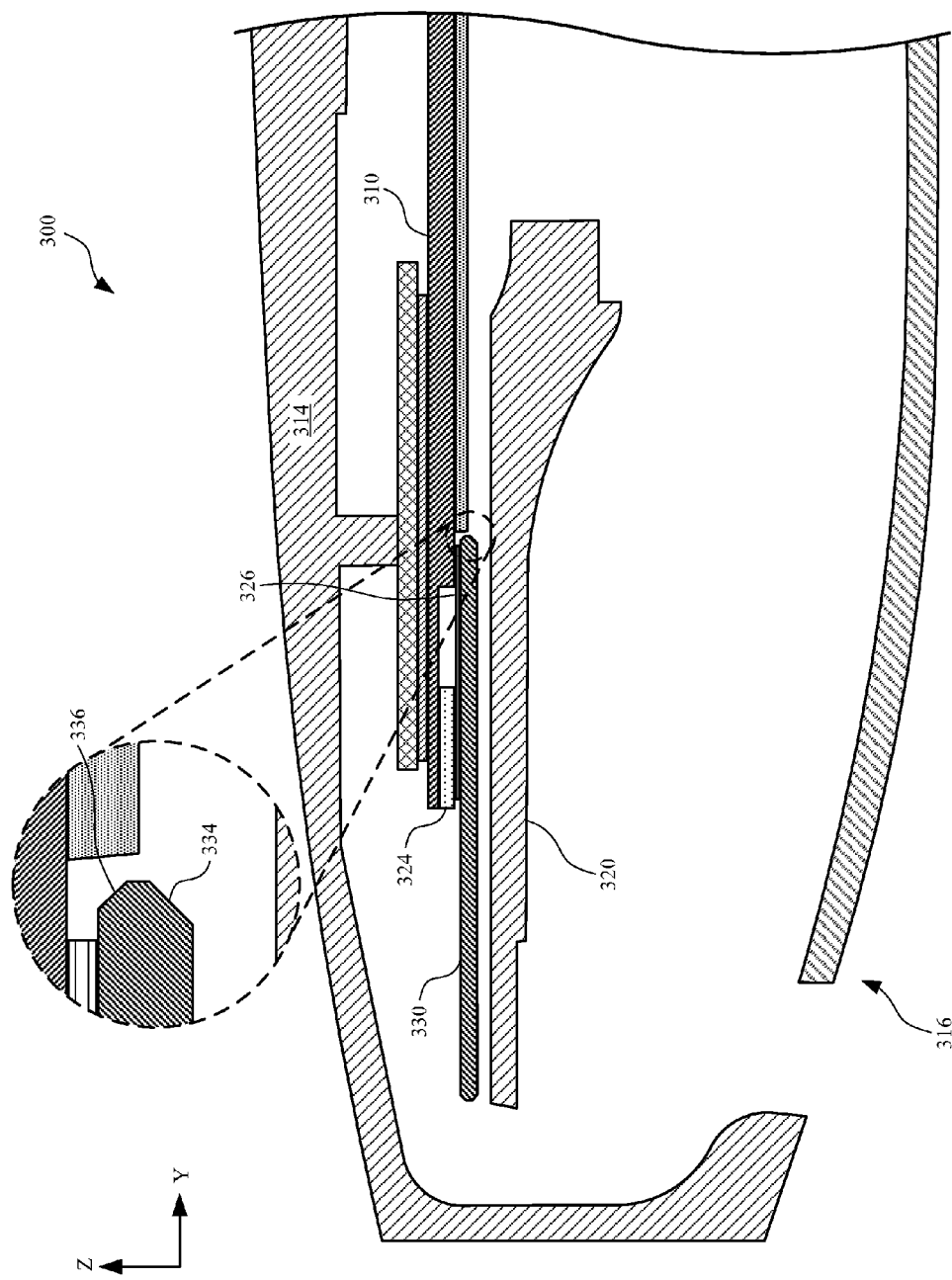
FIG. 12 illustrates a cross sectional view of the portable electronic device showing a top portion and the cover plate, in accordance with the described embodiments.

FIG. 12 illustrates a cross sectional view of the portable electronic device 300 showing a top portion 314 and the cover plate 330, in accordance with the described embodiments. For purposes of illustration and simplicity, several internal components of the portable electronic device 300 are removed. Also, the cover plate 330 in FIG. 12 does not include any layers of material. However, the cover plate 330 may include any layer or layers previously described for a cover plate (see for example, FIG. 3).

As shown, the portable electronic device 300 is in a closed configuration (see, for example, FIG. 2) with the top portion 314 proximate to the bottom portion 316, and in particular, proximate to the top case 320. Also, the cover plate 330 may be adhesively secured with the cover glass 310 and a spacing element 324 via an adhesive layer 326. In addition to providing a cosmetic cover for internal components of the top portion 314, the cover plate 330 may be positioned with respect to the cover glass 310 such that, in the closed configuration, the cover plate 330 engages the top case 320 before the cover glass 310. For example, as shown in FIG. 12, the cover plate 330 is positioned below the cover glass 310 in the z-dimension. In this manner, the cover plate 330 may absorb certain forces or load-bearing events applied to the top portion 314 and prevent damage to the cover glass 310 or display (not shown).

The cover plate 330 may include additional modifications. For example, as shown in the enlarged view, the cover plate 330 may include a first chamfered region 334 and a second chamfered region 336, both of which may extend across a top surface of the cover plate 330. The first chamfered region 334 may enhance a cosmetic appearance of the cover plate 330 while the second chamfered region 336 may provide additional clearance from other features positioned near the cover plate 330. Also, although not shown, the embodiments shown and described throughout this detailed description may include the first chamfered region 334 and/or the second chamfered region 336.

Figure 13:
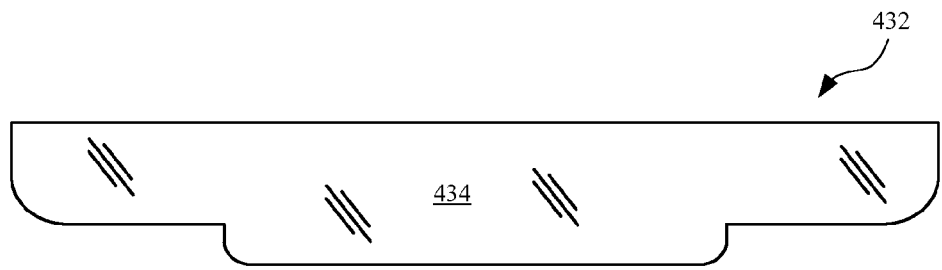
FIG. 13 illustrates a plan view of an embodiment of a substrate used to form a cover plate, in accordance with the described embodiments.

FIG. 13 illustrates a plan view of an embodiment of a substrate 432 used to form a cover plate, in accordance with the described embodiments. The substrate 432 may be formed from any material previously described for a substrate. Also, the substrate 432 may include various layers of material previously described disposed on a surface of the substrate 432. However, in the embodiment shown in FIG. 13, the substrate 432 is formed from glass having a first surface 434 and a second surface (not shown), both of which are generally smooth. The first surface 434 is generally associated with a visible surface of the cover plate when the cover plate is installed on a display or a cover glass of the display (such as the cover glass 110 and display 108 shown in FIG. 1). The first surface 434 may include a relatively high reflective surface that reflects light at a particular intensity to define a first luminance. The first luminance may be associated with a glossy, or relatively shiny, finish due in part to the relatively large amount of light incident on the first surface 434 and reflected from the first surface 434.

Figure 14:
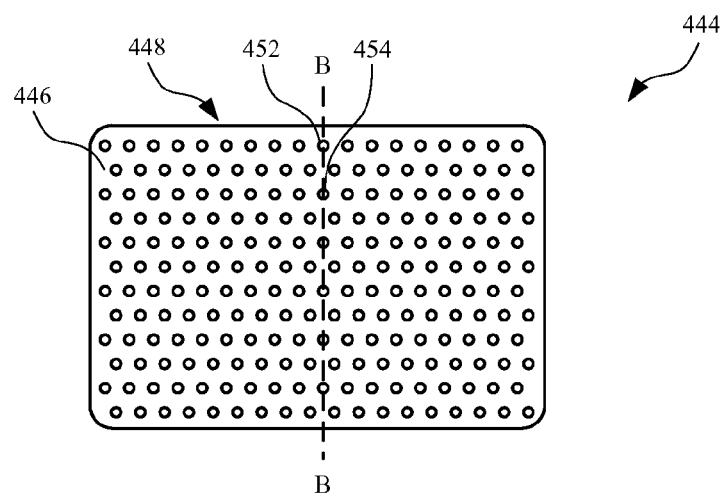
FIG. 14 illustrates a plan view of an embodiment of a track pad suitable for use in a portable electronic device, in accordance with the described embodiments.

FIG. 14 illustrates a plan view of an embodiment of a track pad 444 suitable for use in a portable electronic device, in accordance with the described embodiments. The track pad 444 may be used in a portable computing device to input one or more gestures to the device. As shown, the track pad 444 includes a surface 446 having a dimple pattern 448 defined by several dimples, such as a first dimple 452 and a second dimple 454, both of which are representative of the remaining dimples included in the dimple pattern 448. In other words, the dimple pattern 448 is defined by a material removal process of the track pad 444, and in particular, the surface 446 of the track pad 444. The material removal process may include a blasting process (such as sand blasting or other small-particle blasting generally known in the art for removing material from glass substrate), etching (such as chemical etching), and/or be exposure to an acidic bath (such as anodization). The surface 446 may include a relatively low reflective surface that reflects light at a particular intensity to define a second luminance less than the first luminance of the first surface 434 (shown in FIG. 13). The second luminance may be associated with a matte, or relatively dim, finish due in part to at least some light absorption by the surface 446.

Figure 15:
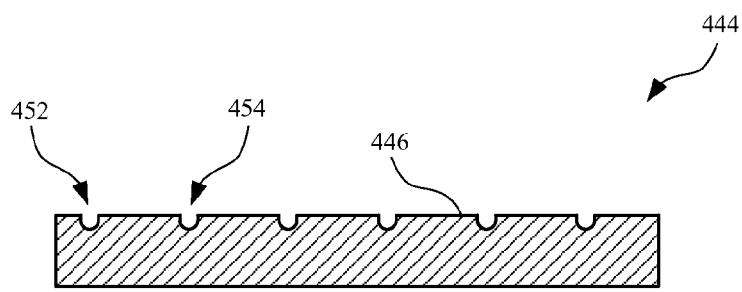
FIG. 15 illustrates a cross sectional view of the track pad shown in FIG. 15, taken along the B-B line.

FIG. 15 illustrates a cross sectional view of the track pad 444 shown in FIG. 15, taken along the B-B line. As shown, the first dimple 452 and the second dimple 454 are positioned below the surface 446 of the track pad 444. In this manner, the first dimple 452 and the second dimple 454 may capture light incident on the track pad 444 causing the light absorption that reduces the reflectivity of the track pad 444.

In some cases, it may be desirable for a portable electronic device to include different components having similar appearances to increase the overall aesthetic appearance of the portable electronic device. For example, a portable electronic device may include a cover plate may include an appearance substantially similar to that of a track pad. An "appearance" may include a reflectivity, color, texture, or a combination thereof. In order for two discrete components to include similar appearances, at least one of the components may undergo one or more processes to, for example, reduce the reflectivity of a surface.

Figure 16:
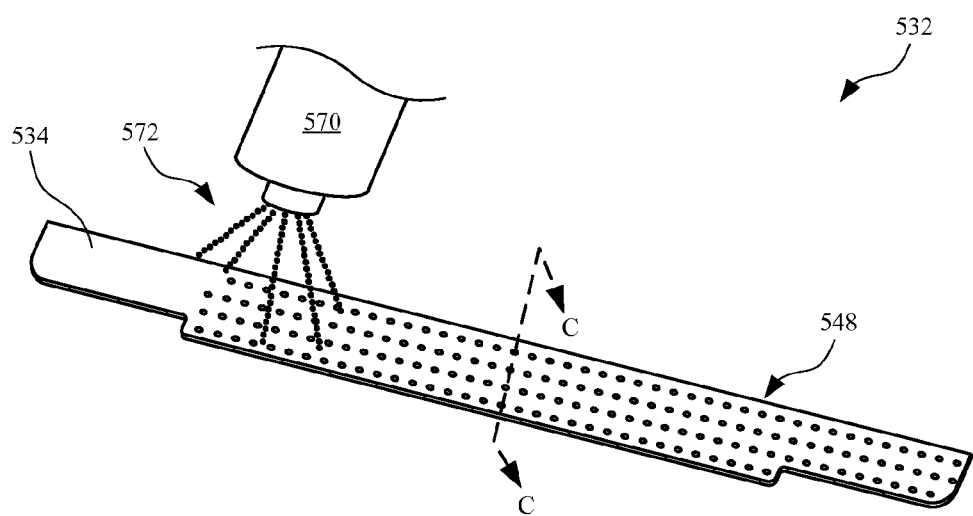
FIG. 16 illustrates an isometric view of an embodiment of a substrate undergoing a material removal process, in accordance with the described embodiments.

FIG. 16 illustrates an isometric view of an embodiment of a substrate 532 undergoing a material removal process, in accordance with the described embodiments. The substrate 532 may be formed from any material previously described for a substrate. Also, the substrate 532 may include various layers of material previously described disposed on a surface 534 of the substrate 532. The surface 534 shown in FIG. 16 is generally associated with a surface of the substrate 532 that does not receive the cosmetic layers previously described. In some embodiments, the substrate 532 undergoes a chemical etching process to remove material from a surface 534 of the substrate 532. In the embodiment shown in FIG. 16, the surface 534 is exposed to particles 572 emitted from a blasting device 570 use to texturize the surface 534. The particles 572 may be selected from materials glass, sand, ceramic, or metal. As result, the surface 534 of the substrate 532 may include a dimple pattern 548. The dimple pattern 548 may alter the appearance of the substrate 532 in terms of reflectivity, texture (including roughness), or a combination thereof. For instance, the substrate 532 may be reduced from a first luminance to a second luminance less than the first luminance. Accordingly, the reflectivity of the substrate 532 may be reduced due to the dimple pattern 548 while the roughness may increase. If desired, one or more material removal processes may be applied to the substrate 532 such that the substrate 532 includes an appearance similar to that of the track pad 444 (shown in FIG. 14). Also, the substrate 532, along with one or more colored layers (of ink, for example) may combine to form a cover plate that includes an appearance substantially similar to that of the track pad 444.

Figure 17:
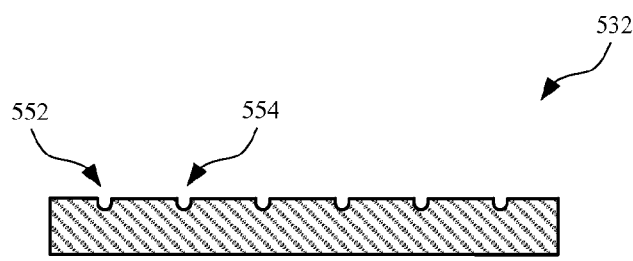
FIG. 17 illustrates a cross sectional view of the substrate shown in FIG. 17, taken across the C-C line.

FIG. 17 illustrates a cross sectional view of the substrate shown in FIG. 17, taken across the C-C line. The substrate 532 may include a first dimple 552 and a second dimple 554, both of which are representative of the remaining dimples included in the dimple pattern 548 (shown in FIG. 16). The first dimple 552 and the second dimple 554 may be substantially to the first dimple 452 and the second dimple 454, respectively, of the track pad 444 (shown in FIG. 14) in terms of dimple diameter, depth, and/or spacing (distance) with respect to surrounding dimples. In this manner, the substrate 532 can include an appearance substantially similar to that of the track pad 444.

Although the substrate 532 shown in FIGS. 16 and 17 includes material removal processes designed to create an appearance similar to that of the track pad 444 shown in FIG. 14, the substrate 532 may undergo one or more material removal processes to provide a cover plate with an appearance similar to another component of a portable electronic device. For example, a cover plate that includes the substrate 532 and one or more colored layers applied to the substrate 532 may include an appearance substantially similar to the display 108 (shown in FIG. 1) or a border region surrounding the display 108. The "appearance" may include a reflectivity, color, texture, or a combination thereof.

Figure 18:
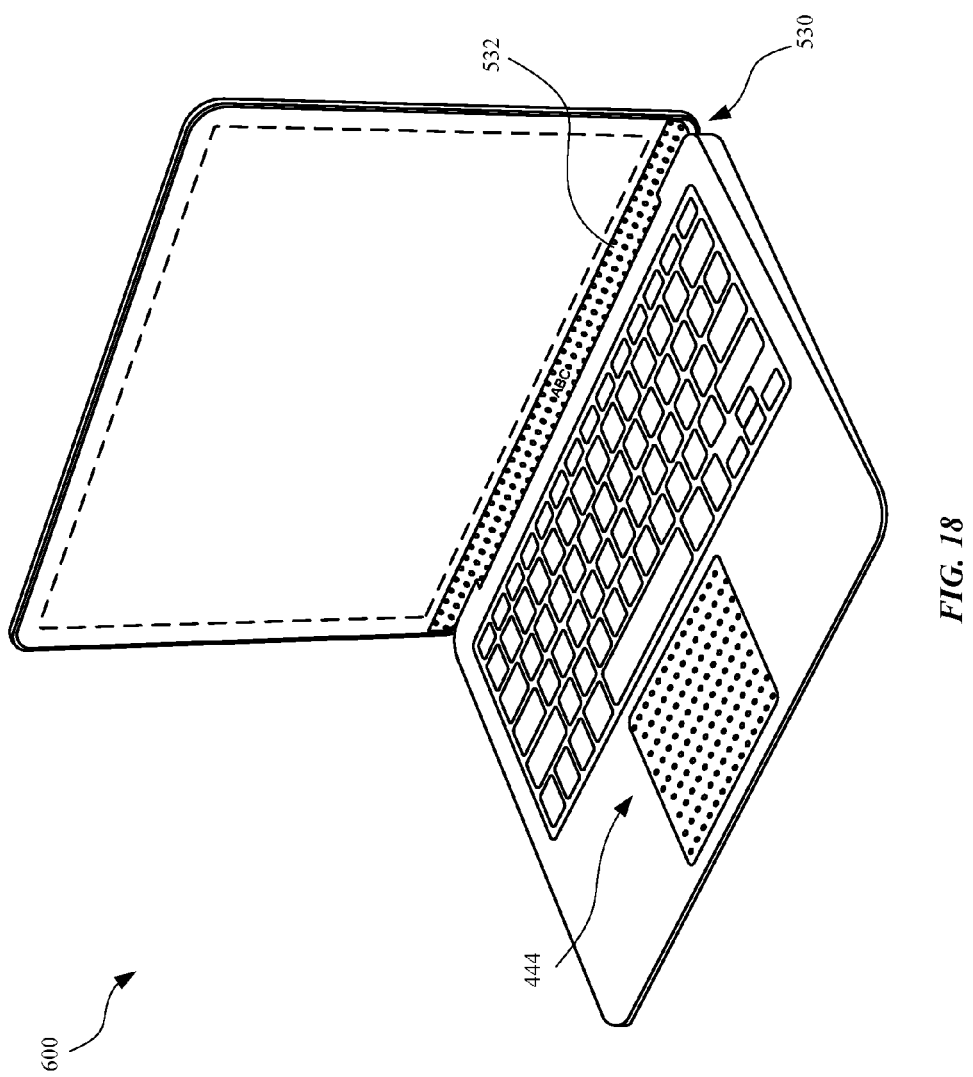
FIG. 18 illustrates an isometric view of an embodiment of a portable electronic device having a cover plate with an appearance similar to that of a track pad.

FIG. 18 illustrates an isometric view of an embodiment of a portable electronic device 600 having a cover plate 530 with an appearance similar to that of a track pad 444. The cover plate 530 may include the substrate 532 (shown in FIG. 16). The cover plate 530 and the track pad 444 may be similar in reflectivity, texture (roughness), color, or a combination thereof.

Figure 19:
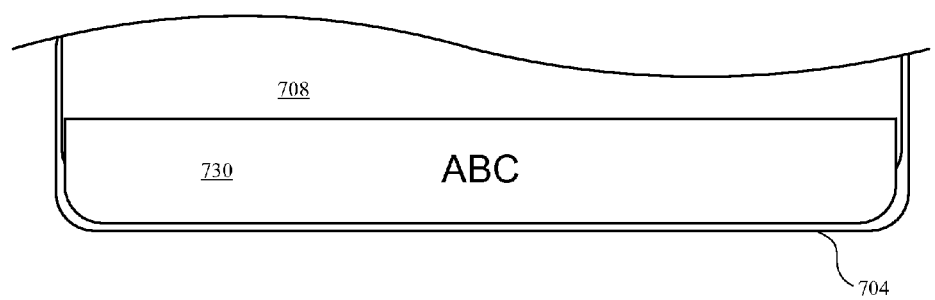
FIG. 19 illustrates a plan view of an alternate embodiment of a cover plate.
Figure 20:
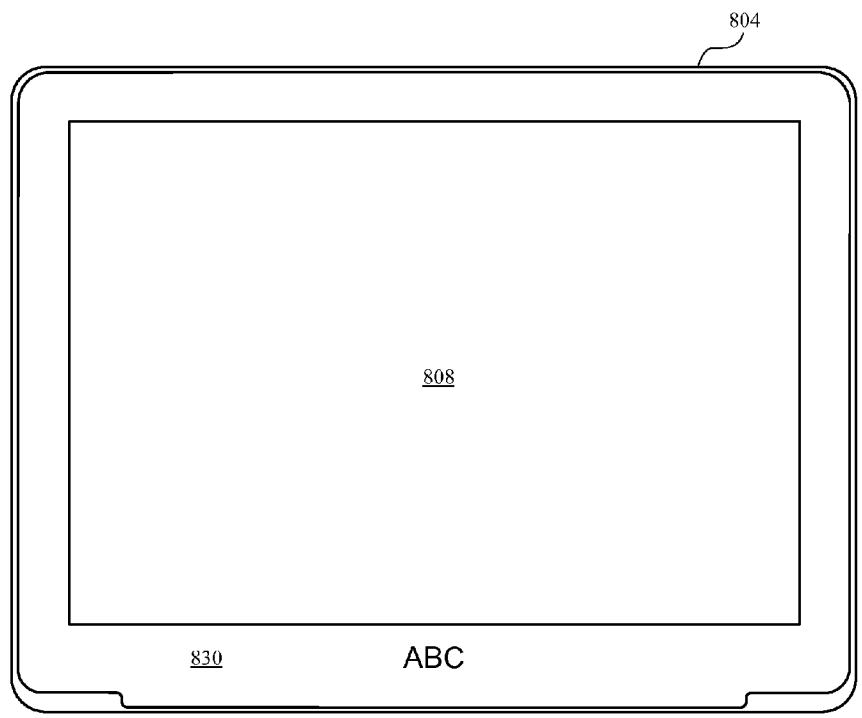
FIG. 20 illustrates a plan view of an alternate embodiment of a cover plate.

The cover plate may include different shapes. For example, FIG. 19 illustrates a plan view of an alternate embodiment of a cover plate 730. In this design, the cover plate 730 is disposed over a display 708, and includes a shape and contour substantially similar to a shape and contour of the top portion 704. In other words, the cover plate 730 does not include an extended region 280 (shown in FIG. 3). This configuration may be used to cover additional internal components. FIG. 20 illustrates a plan view of an alternate embodiment of a cover plate 830. The cover plate 830 is designed to extend around outer peripheral portion of a display 808 and generally fit within the dimensions of a top portion 804. This allows for a consistent-looking frame or border around the display 808, and also provides additional protection to the display 808. The cover plates shown in FIGS. 19 and 20 may include any layers previously described for a cover plate 130 (shown in FIGS. 3 and 10) or a cover plate 530 (shown in FIG. 18), and may be formed by any materials used to form the cover plate and its components, such as a substrate 232 (shown in FIG. 3) or a substrate 532 (shown in FIG. 16).

Figure 21:
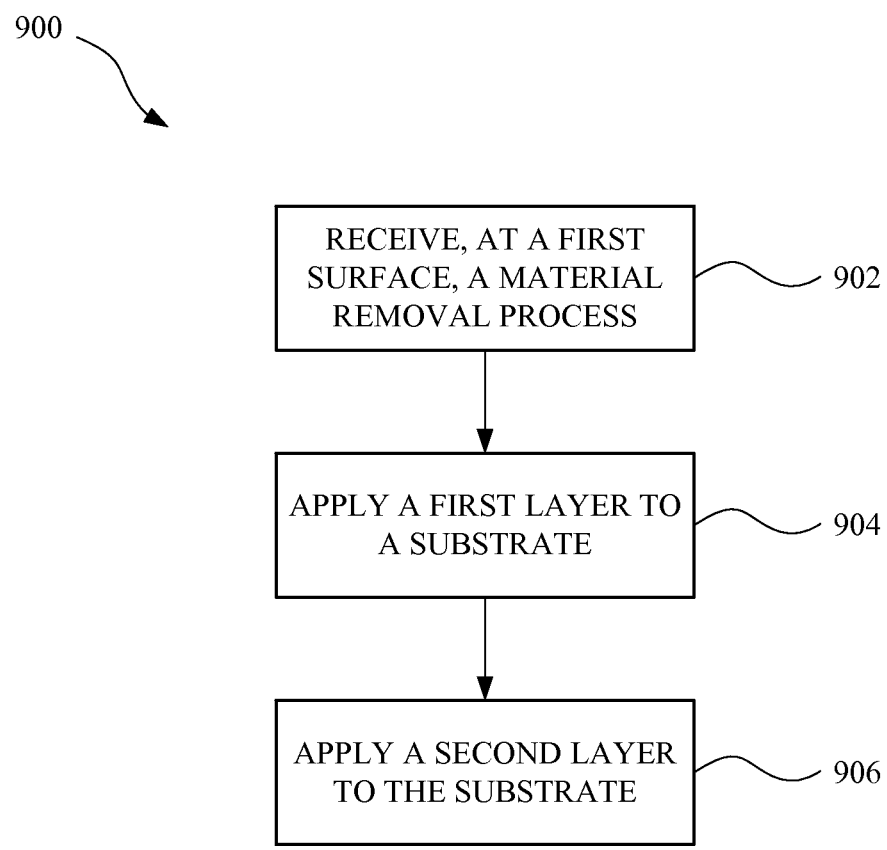
FIG. 21 illustrates a flowchart showing a method for forming a cover plate for a portable electronic device.

FIG. 21 illustrates a flowchart 900 showing a method for forming a cover plate for a portable electronic device. In step 902, a material removal process is received at a first surface of the cover plate. The material removal process may be a blasting process, a chemical etching process, or a combination thereof. The material removal process may alter at least one surface of the substrate such that the substrate, in combination with one or more layers applied to the substrate that defines the cover plate, includes an appearance, such as surface texture, similar to that of a component. In this regard, the appearance may further include a dimple pattern. Also, the material removal process may reduce the reflectivity of the cover plate such that the appearance may further be similar to that of the component.

In step 904, a first layer is applied to a substrate. In some embodiments, the substrate is formed from a transparent material such as glass. Also, in some embodiments, the first layer is formed from an ink material. The ink material may be a relatively dark material, such as black. Further, in some embodiments, the first layer is opaque. The substrate may include a first (front) surface and a second (rear) surface opposite the first surface. In some embodiments, the first layer is disposed on the second surface. Also, the first layer may include void regions on the second surface define a region free of the first layer. Also, in some embodiments, step 904 is preceded by step 902.

In step 906, a second layer is applied to the substrate. The second layer may be applied to the void regions defined by the first layer. Also, a portion of the second layer may be applied to the first layer. In some embodiments, the second layer includes an ink material. Also, in some embodiments, the second layer may include a color substantially similar to that of an exterior component of the portable electronic device. For example, the second layer may be formed from a gray or metallic gray color that is substantially similar to a top case or a track pad of the portable electronic device. Also, in some embodiments, the second layer defines an indicium. The indicium may be selected from a letter, a word (formed from one or more letters), a shape, a symbol, or a combination thereof. Accordingly, the void regions may be substantially similar in shape as that of the indicium.

The described embodiments for a cover plate include a transparent substrate having one or more layers applied to the substrate. These layers may be disposed on a second (rear) surface of the substrate. However, due to the transparency of the substrate, the one or more layers. In other embodiments, the one or more layers may be disposed on a first (front) surface opposite the second surface. This may allow for additional surface texture that may be sensed by a user even when the cover plate is installed on the cover glass (or in some cases, the display). Further, the one or more layers may be disposed on the first surface when the substrate is not formed from a transparent material.

Also, while the described embodiments illustrate several layers applied to a substrate, in other embodiments, the substrate includes a single layer. In other embodiments, the substrate includes two layers. Still, in other embodiments, the substrate includes three or more layers. These layers may be formed from any material or materials previously described for a layer applied to a substrate.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A cover plate for an electronic device having an enclosure that includes a display, the cover plate comprising:
   a substrate that conforms to a size and a shape of the display of the electronic device, the substrate covering an operational component disposed along an edge of the display; and
   a cosmetic layer disposed on the substrate, wherein the substrate and the cosmetic layer combine to form a radio-transparent cover that allows the operational component disposed along the edge of the display to transmit and/or receive electromagnetic radiation through the radio-transparent cover, the cosmetic layer comprising:
      a first layer disposed on the substrate;
      a second layer disposed on the substrate and defining an indicium; and
      a third layer disposed on the first layer and the second layer.

2. The cover plate of claim 1, wherein the first layer, the second layer, and the third layer include an ink material.

3. The cover plate of claim 1, wherein the indicium is selected from a group consisting of a letter, a word, and a symbol.

4. The cover plate of claim 3, wherein the indicium includes a first appearance and the enclosure includes a second appearance similar to the first appearance.

5. The cover plate of claim 4, wherein the first appearance includes a first color and the second appearance includes a second color similar to the first color.

6. The cover plate of claim 1, wherein the substrate is formed from a transparent material.

7. The cover plate of claim 1, further comprising a chamfered region extending across a surface.

8. A portable electronic device, comprising:
   a bottom portion;
   a top portion rotationally coupled with the bottom portion, the top portion comprising a display and a protective cover disposed over the display;
   an operational component disposed in the top portion; and
   a cover plate, separate from the protective cover, comprising a transparent material and covering the operational component, the cover plate defining:
      a first surface that defines a portion of an exterior surface of the portable electronic device; and
      a second surface opposite the first surface and including a first layer formed from an opaque material that hides the operational component.

9. The portable electronic device of claim 8, wherein the cover plate further comprises an extended region that covers an internal component disposed in the top portion.

10. The portable electronic device of claim 9, wherein the bottom portion comprises a recessed portion that includes a first dimension and wherein the extended region includes a second dimension greater than or equal to the first dimension.

11. The portable electronic device of claim 8, wherein the first layer includes a void region and wherein the second surface further includes a second layer disposed over the void region.

12. The portable electronic device of claim 11, wherein the second layer is disposed on both the void region and a portion of the first layer.

13. The portable electronic device of claim 12, wherein the second surface further comprises a third layer disposed over the first layer and the second layer.

14. The portable electronic device of claim 8, wherein the transparent material is glass.

15. The portable electronic device of claim 8, wherein the cover plate partially overlaps the protective cover.

16. A portable electronic device, comprising:
   a bottom portion;
   a top portion rotationally coupled with the bottom portion and comprising:
      a display; and
      a protective cover disposed over the display and defining a first part of an exterior surface of the top portion;
   an operational component disposed in the top portion; and
   an opaque cover plate covering the operational component and defining a second part of the exterior surface of the top portion, a first portion of the opaque cover plate overlying at least a second portion of the protective cover.

17. The portable electronic device of claim 16, wherein the opaque cover plate comprises:
   a transparent substrate; and
   an opaque cosmetic layer.

18. The portable electronic device of claim 17, wherein the opaque cosmetic layer comprises:
   a first layer disposed on the substrate;
   a second layer disposed on the substrate and defining an indicium; and
   a third layer disposed on the first layer and the second layer.

19. The portable electronic device of claim 16, wherein the first portion of the opaque cover plate is adhesively secured to the second portion of the protective cover.

20. The portable electronic device of claim 16, wherein:
   the operational component is an antenna; and
   the opaque cover plate is radio-transparent.

* * * * *